(12) United States Patent
Liu

(10) Patent No.: US 8,781,504 B1
(45) Date of Patent: Jul. 15, 2014

(54) SYSTEM FOR MONITORING IN REAL-TIME MOVEMENT OR LOCATION AND METHOD THEREOF

(71) Applicant: Wen Hsiung Liu, Kaohsiung (TW)

(72) Inventor: Wen Hsiung Liu, Kaohsiung (TW)

(73) Assignee: Yi-Phone Inc., Kaohsiung (TW)

( * ) Notice: Subject to any disclaimer, the term of this patent is extended or adjusted under 35 U.S.C. 154(b) by 59 days.

(21) Appl. No.: 13/726,379

(22) Filed: Dec. 24, 2012

(51) Int. Cl.
*H04W 24/00* (2009.01)
*H04W 4/02* (2009.01)

(52) U.S. Cl.
CPC .................. *H04W 4/025* (2013.01)
USPC ............ 455/456.5; 455/456.1; 455/403; 340/10.1

(58) Field of Classification Search
USPC ............ 455/456.5, 456.1, 403; 340/10.1
See application file for complete search history.

(56) References Cited

U.S. PATENT DOCUMENTS

| | | | | |
|---|---|---|---|---|
| 2009/0058641 | A1* | 3/2009 | DeMarco | 340/540 |
| 2010/0076631 | A1* | 3/2010 | Mian | 701/19 |
| 2010/0204616 | A1* | 8/2010 | Shears et al. | 600/595 |
| 2011/0152637 | A1* | 6/2011 | Kateraas et al. | 600/301 |
| 2012/0221254 | A1* | 8/2012 | Kateraas et al. | 702/19 |
| 2013/0150028 | A1* | 6/2013 | Akins et al. | 455/427 |
| 2013/0302758 | A1* | 11/2013 | Wright | 434/65 |
| 2013/0332286 | A1* | 12/2013 | Medelius et al. | 705/14.66 |
| 2014/0018686 | A1* | 1/2014 | Medelius et al. | 600/483 |

* cited by examiner

*Primary Examiner* — Danh Le
(74) *Attorney, Agent, or Firm* — Muncy, Geissler, Olds & Lowe, P.C.

(57) ABSTRACT

The present invention relates to a system for monitoring in real-time movement or location, comprising at least one sensor, at least one receiver, a server unit and a database unit. Regarding the system of the present invention, the signals of the sensors attached on users or articles are transmitted to a website via a Wireless Ad Hoc Network and a local area network to real-time monitor movement or location for users or articles. The present invention further provides a method for monitoring in real-time movement or location for users or articles.

21 Claims, 6 Drawing Sheets

| Serial number of packet | Name of receiver | Wireless Strength (RSSI, received signal strength indicator) | The Receiver with highest RSSI | The receiver with the highest RSSI in most times during a particular time. |
|---|---|---|---|---|
| 1 | Room A | 108 | Room A | Room B |
| 1 | Room B | 102 | | |
| 2 | Room A | 108 | Room B | |
| 2 | Room B | 109 | | |
| 3 | Room B | 109 | Room B | |
| 3 | Room C | 100 | | |
| 4 | Room B | 109 | Room D | |
| 4 | Room D | 120 | | |

SYSTEM FOR MONITORING IN REAL-TIME MOVEMENT OR LOCATION AND METHOD THEREOF

FIELD OF THE INVENTION

The present invention relates to a system for monitoring in real-time movement or location and method thereof.

DESCRIPTION OF PRIOR ART

With increase of an aging population year by year, it is important for long-term caring of an elderly people who live alone, dementia, or bed-ridden person. Nowadays a home care and a care institution actually solve the partial problems for long-term caring.

Currently, a large monitoring apparatus (such as electrocardiogram) is disposed in the care institution for monitoring physiological status; however, the monitor mode merely applies to one-to-one use and cannot simultaneously monitor the physiological signal for other patients. In addition, resources of the care institution (such as number of beds and care staff) are not capable of caring more and more elderly persons due to the fast growing aging population, and many elderly persons cannot burden with the charge of the care institution.

Moreover, certain home healthcare equipment is incorporated with functions of communication and video currently, and thereby providing the remote care staff for dealing with the sudden incident via a network; however, the use of the home healthcare equipment is quite complicated and expensive for aged persons. For the dementia person, if they do not carry the medical equipment, the remote care staff is unable to monitor their conditions in real-time.

With the advance of network and communication technology, the Zigbee or Wi-Fi technology has been used for the home care and the medical monitoring currently. With respect to IEEE 802 networking standard, the Zigbee technology is a power-saving technology as compared with Bluetooth or Wi-Fi (Table 1).

Due to that the Zigbee system defines the network layer specifications and provides application layer framework which supports star, mesh, or cluster-tree topologies, other system needs to conform to the above network routing topology for allowing instruments to communicate with each other.

In addition, the network routing topology needs a PAN (personal area network) coordinator responsible for the formation and operation of the network. However, the data transmission is not so efficiently due to that the packet data needs to be allocated via the PAN coordinator.

TABLE 1

| Current wireless network technology | | | |
|---|---|---|---|
| | Zigbee | Wi-Fi | Bluetooth |
| Transmission rate | 20~250 kbps | 250 Mpbs | 1 Mpbs |
| Receiving and sending data | less | large | medium |
| Power consumption | low | high | high |
| Power | −25~0 dBm | 15-20 dBm | 0-10 dBm |
| Transmission distance | 10-100 m | 100 m | 10 m |

SUMMARY OF THE INVENTION

The present invention provides a system for monitoring in real-time movement or location, comprising: (a) at least one sensor, comprising a three-axis accelerometer chip and a first radio frequency chip (RFIC), for detecting movement of at least one user or at least one article and transmitting a signal, comprising at least one parameter data, via a wireless ad hoc network system periodically; (b) at least one receiver, comprising a second radio frequency chip (RFIC) and being connected to the sensor via the wireless ad hoc network system, in which the second RFIC measures strength of the signal transmitted by the sensor, to receive the parameter data of the user or the article, and then via a local area network system the parameter data is transferred to a network address periodically; (c) a server unit for setting at least one information of the user or the article, link the information to the parameter data received from receiver, and converting the parameter data into signal data by an operation unit of the server unit; and (d) a database unit being connected to the server unit for storing the signal data of the user or the article, for editing and publishing the signal data in a website via the server unit, and presenting the movement or location of the user or the article in a web browser.

The present invention further provides a method for monitoring in real-time movement or location, comprising steps of: (a) setting at least one information of a user or an article in a server unit; (b) detecting movement of the user or the article by a three-axis accelerometer chip, included in a sensor carried thereby, and transmitting at least one signal, comprising parameter data, periodically by a first radio frequency chip, included in the sensor, via a wireless ad hoc network system; (c) measuring strength of the signal transmitted by the sensor, and receiving the parameter data of the user or the article by a second radio frequency chip; (d) transmitting the parameter data and the signal to a network address periodically by the receiver via a local area network system; (e) linking the information of the step (a) to the parameter data received from the receiver; (f) converting the parameter data and the signal into signal data by an operation unit of the server unit; and (g) storing the signal data in a database unit, and editing and publishing in a website by the server unit so as to present the movement or location of the user or the article in a web browser.

DETAILED DESCRIPTION OF THE INVENTION

Aiming on that the past caring system did not monitor in real-time movement or location for the living alone person, the dementia person or the bed-ridden person efficiently, and encountered problems of high cost and high power consumption of the monitoring devices, the present invention provides a system for monitoring in real-time movement or location, which is capable of obtaining current movement, physiological signal and location in real-time when the living alone person, the dementia person or the bed-ridden person is subject to an urgent condition, and informing the nursing staff or the management staff to provide essential assistance in real-time.

In the physical architecture, the present invention provides a system for monitoring in real-time movement or location, which comprises: (a) at least one sensor, comprising a three-axis accelerometer chip and a first radio frequency chip (RFIC), for detecting movement of at least one user or at least one article and transmitting a signal, comprising at least one parameter data, via a wireless ad hoc network system periodically; (b) at least one receiver, comprising a second radio frequency chip (RFIC) and being connected to the sensor via the wireless ad hoc network system, in which the second RFIC measures strength of the signal transmitted by the sensor, to receive the parameter data of the user or the article, and then via a local area network system the parameter data is transferred to a network address periodically; (c) a server unit for setting at least one information of the user or the article, link the information to the parameter data received from receiver, and converting the parameter data into signal data by an operation unit of the server unit; and (d) a database unit being connected to the server unit for storing the signal data of the user or the article, for editing and publishing the signal data in a website via the server unit, and presenting the movement or location of the user or the article in a web browser.

The term "parameter data" as used herein, unless otherwise indicated, comprises an identification number of the sensor, the movement status measured by the three-axis accelerometer chip, pulse signal or condition of an emergency button (not limited to the above parameter data).

The term "strength of signal" as used herein, unless otherwise indicated, means a signal (strength) of wireless packet being measured by the second radio frequency chip (RFIC), which is defined as Receive Signal Strength Indicator, RSSI.

The term "information" as used herein, unless otherwise indicated, means personal information, article information, movement, pulse signal, signal value or location (not limited to the above information).

The term "receiver" as used herein, unless otherwise indicated, means a receiver for receiving the broadcast signal automatically.

In one embodiment, the sensor of the present invention further comprises a detachable pulse sensor probe for transmitting a pulse signal to the receiver by the first RFIC via the wireless ad hoc network system.

In one embodiment, the sensor of the present invention further comprises an emergency button using the first RFIC to transmit the parameter data and the signal of the user or the article, which are transferred and updated to a website via the wireless ad hoc network and Internet, thereby reminding a management staff to notice a condition of the user or the article.

In the above embodiment, the wireless transmission distance of the present invention is increased with the strength of the signal via the sensor which comprises a power amplifier. In addition, a distance of the wireless transmission is capable of reaching over 100 m.

In one embodiment, the receiver of the present invention comprises a wireless network transceiver module and a local area network module, wherein a standard of the wireless network transceiver module is IEEE 802.15.4 that can provide an energy-saving feature. If the wireless network transceiver module is replaced by other wireless network systems, such as Bluetooth or Wi-Fi, the system of the present invention will not save power. Moreover, due to that the architecture of the present invention uses a Wireless Ad Hoc Network system that is capable of achieving the transmission efficacy of "many-to-one" or "many-to-many".

In one embodiment, the term "local area network" (module) in the present invention means a computer network covering a local area, such as a hospital, office or floor etc. The local area network comprises but not limited to Token Ring, Fiber Distributed Data interface (FDDI) and Ethernet. In the preferred embodiment, the local area network of the present invention adopts an Ethernet network IEEE 802.3.

In one embodiment, the sensor of the present invention comprises a first microprocessor and the receiver comprises a second microprocessor, wherein the first microprocessor receives at least one analog signal of the sensor, converts the analog signal into a digital signal and transmits the digital signal to the wireless network transceiver module, and the second microprocessor collects the parameter data and the signal received from the wireless network transceiver module in receiver, and transmits the same to the local area network module.

In one embodiment, the server unit of the present invention comprises an emergency contact unit, in which when a value of the parameter data sent by the sensor is lower or higher than a critical value or range set by the server unit, the emergency contact unit actively informs the management staff to confirm the movement or location of the user or the article.

In one embodiment, the server unit and database unit can be a cloud computing device, and all parameter data and signal can be operated and stored by the cloud server and cloud database. If there is any unusual condition, a warning message will be sent to inform the management staff via cloud server.

The present invention further provides a method for monitoring in real-time movement or location, comprising steps of: (a) setting at least one information of a user or an article in a server unit; (b) detecting movement of the user or the article by a three-axis accelerometer chip, included in a sensor carried thereby, and transmitting at least one signal, comprising parameter data, periodically by a first radio frequency chip, included in the sensor, via a wireless ad hoc network system; (c) measuring strength of the signal transmitted by the sensor, and receiving the parameter data of the user or the article by a second radio frequency chip; (d) transmitting the parameter data and the signal to a network address periodically by the receiver via a local area network system; (e) linking the information of the step (a) to the parameter data received from the receiver; (f) converting the parameter data and the signal into signal data by an operation unit of the server unit; and (g) storing the signal data in a database unit, and editing and publishing in a website by the server unit so as to present the movement or location of the user or the article in a web browser.

The techniques, approaches and advantages of the present invention will become more apparent from the following detailed description when taken in conjunction with the accompanying drawings.

EXAMPLES

Example 1

The Framework for the System of the Present Invention

The examples below are non-limiting and are merely representative of various aspects and features of the present invention.

Figure 1:
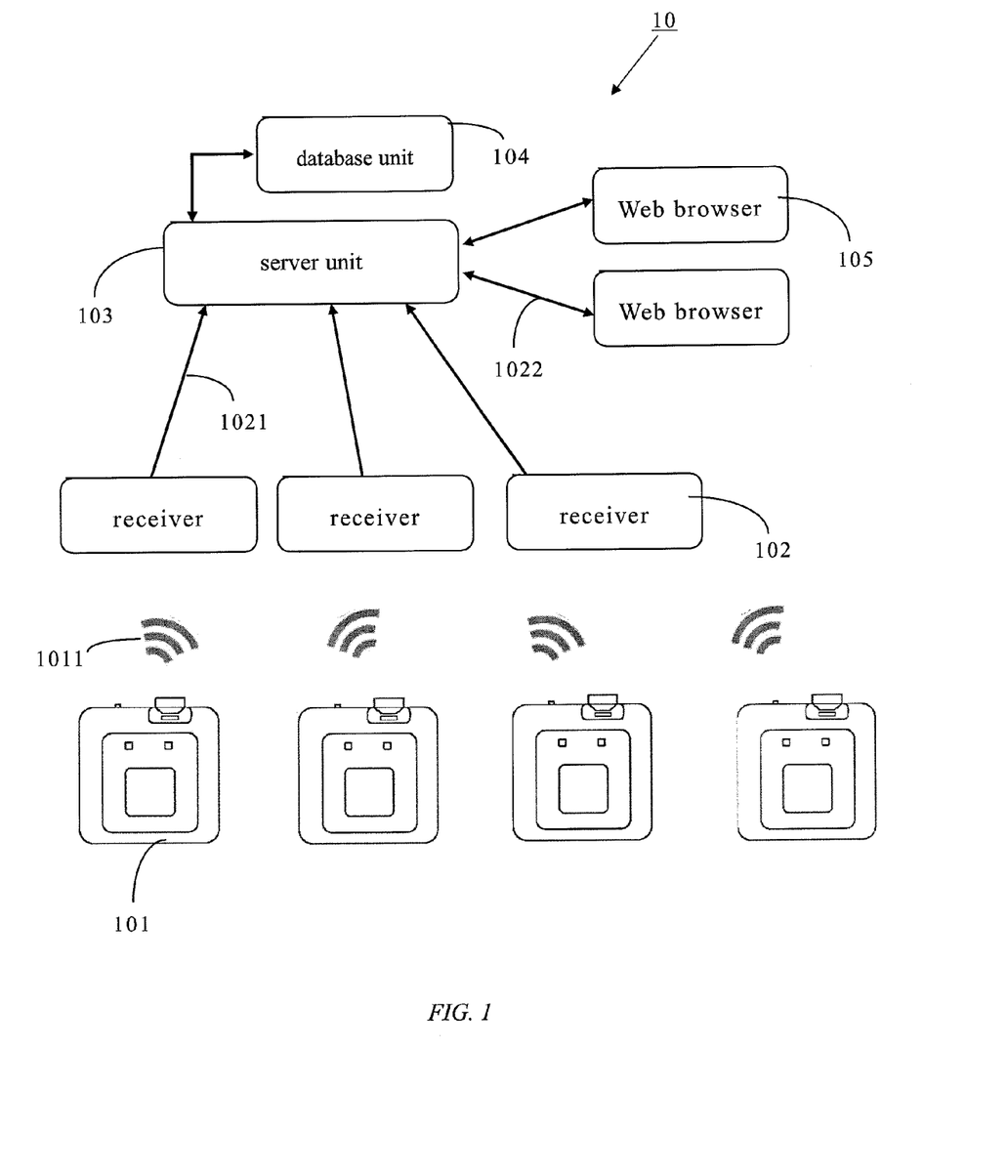
FIG. 1 is a schematic view showing a system of the present invention.
Figure 2:
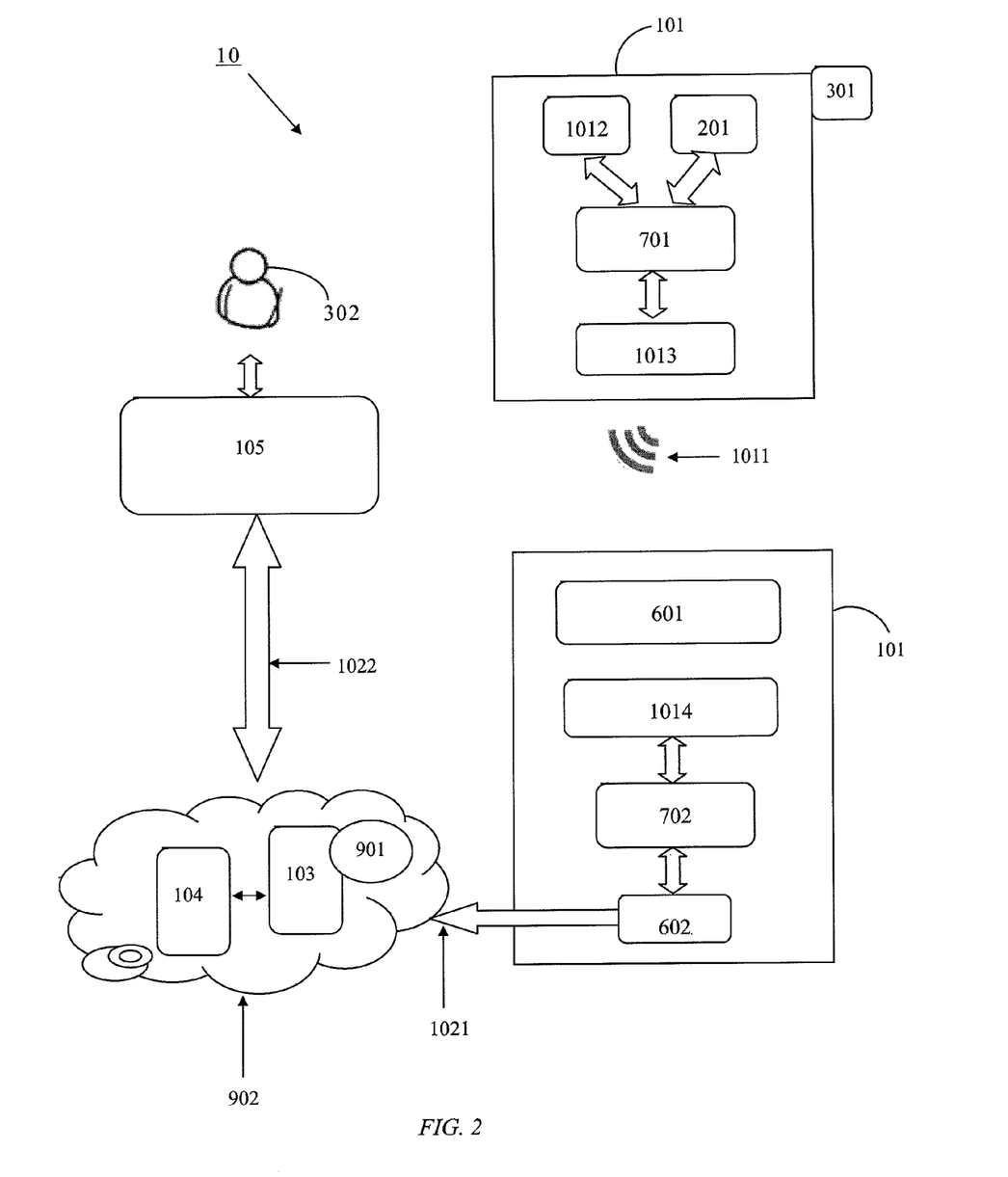
FIG. 2 is a schematic view for an embodiment of system of the present invention.

FIGS. 1 and 2 showed an embodiment for a system of the present invention for monitoring in real-time movement or location. The system of the present invention 10 was used for monitoring in real-time a living alone person, a dementia person or a bed-ridden person, rendering the nursing staff or the management staff to monitor in a large-scale the living alone person, the dementia person or the bed-ridden person simultaneously. In particular, when the living alone person or the dementia person was in an urgent condition outdoors, the system of the present invention was capable of transmitting in real-time a signal of a motion status or physiological condition. In the present example, the system of the present invention incorporated with a wireless network system, specifically a Wireless Ad Hoc network 1011 and a local area network system 1021 to achieve a function for monitoring in real-time movement or location.

As shown in FIGS. 1 and 2, the system of the present invention 10 comprised: (a) at least one sensor 101; (b) at least one receiver 102; (c) a server unit 103; and (d) a database unit 104. The function of these elements and the connection relationship between the elements and the internet were stated below separately.

(a) Sensor 101

In one example, when a user or an article carried a sensor, the sensor 101 comprised a three-axis accelerometer 1012 for detecting the movement of the user or article outdoors or indoors. Via the framework of a wireless Ad Hoc network 1011, the sensor transmits parameter data of the user or the article using a first radio frequency chip (RFIC) 1013.

In other example, the sensor 101 is in combination with a detachable pulse sensor probe 201 to monitor in real-time the pulse of the user for transmitting a pulse signal periodically (3~5 seconds) via the first RFIC 1013 via the wireless Ad Hoc network system 1011. When a pulse rate of the user was unusual, the management staff was aware of the status of the user through a web browser 105 and then to take an appropriate action. In this example, the term "parameter data" meant such as an identification number of the sensor, movement, pulse signal or condition of an emergency button.

(b) Receiver 102

By way of the wireless Ad Hoc network system 1011, when the user carried the sensor 101, the second radio frequency chip 1014 in the receivers 102 set outdoors or indoors measured strength of the wireless signal which was transmitted by the sensor, and received the parameter data of the user or the article, the parameter data was obtained from the three-axis accelerometer chip 1012 or the pulse sensor probe 201. In addition, due to that the receiver of the present invention comprised a wireless network transceiver module 601 and a local area network module 602, when the receiver received the parameter data of the user or the article, the parameter data and the wireless signal were transmitted to a network address via the local area network module 602 periodically. In this example, the local area network system adopted an Ethernet Network.

Figure 3:
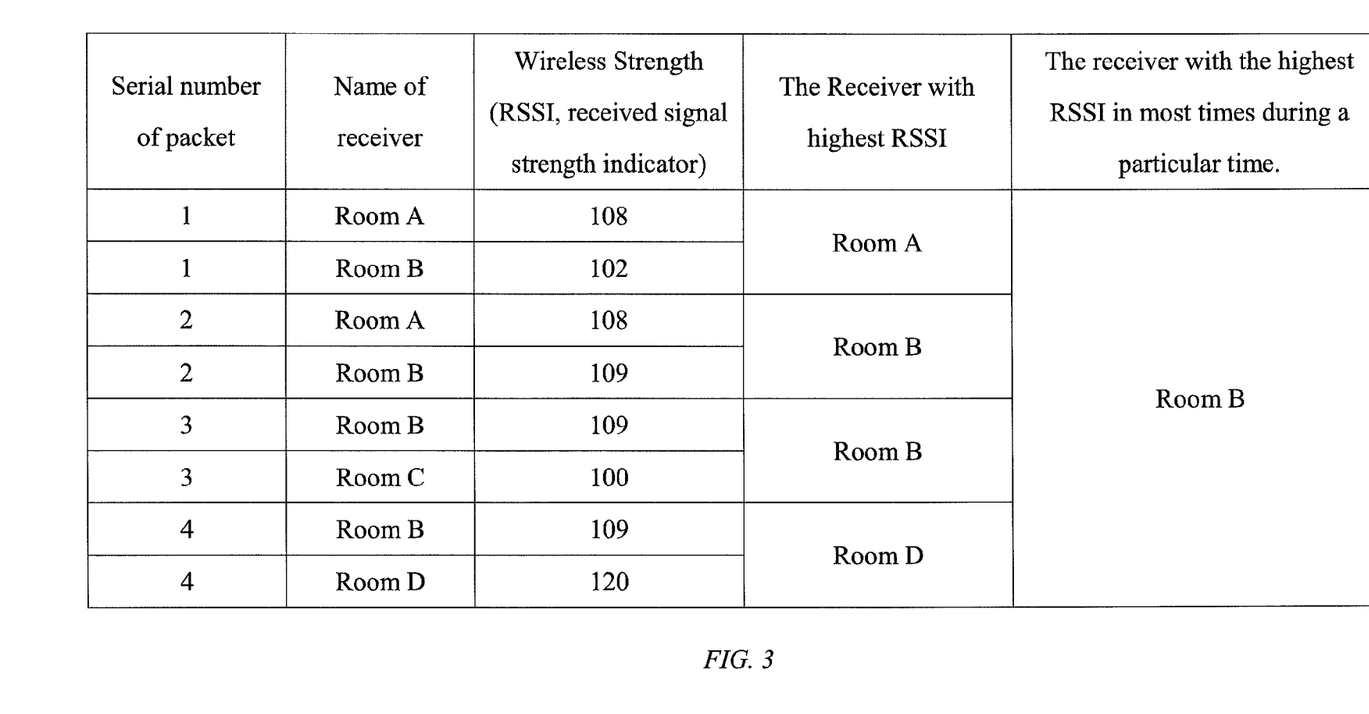
FIG. 3 is an embodiment for positioning algorithm of the present invention.

In the above example, the term "periodically" meant an interval between two pieces of the transmitting parameter data (signal) might be 1 second, 2 seconds . . . or 15 seconds. When the interval was shorter, more energy was consumed; however, the immediateness was great. In addition, FIG. 3 showed an example for positioning calculation of the present invention. The positioning function of the present invention is to collect all packet data of a sensor received by different receivers and to compare the strength of signal of the same wireless packet serial number. The position of the user or the article carried with the sensor will be calculated nearby the receiver that received strongest strength of signal. To increase stability of the positioning function, the receiver with most times of receiving strongest strength of signal is chose as the location of the sensor in a time interval. In the example, if the interval between two pieces of the transmitting parameter data (signal) of sensor is longer than the time interval of positioning, positioning will be erroneous.

In the above example, the term "strength of wireless signal" meant the signal (strength) of wireless packet measured by the second RFIC that was defined as Receive Signal Strength Indicator, RSSI. In this example, the wireless signal and the parameter data simultaneously transmitted to the server unit for calculating and storing.

(c) Server Unit 103 AND (d) Database Unit 104

In this example, the server unit 103 and the database unit 104 could be connected with receivers via the wireless network system or the local area network system. In the preferred embodiment, the server unit 103 and the database unit 104 were cloud computing device 902.

In the implementation process, the information of the user or the article must be set up in the server unit 103. When the server unit received the parameter data and signal, the data and signal were linked and compared to the pre-set information of the user or the article, and transmitted to the database unit 104 for storing. Then, the signal data was edited and published in a website by the server unit 103 through an internet 1022 to present the movement or location of the user or the article in a web browser 105.

In another example, as shown in FIG. 2, the server was connected with an emergency contact unit 901. When the value of the parameter data transmitted by the sensor 101 was lower or higher than a critical value stored in the server unit 103, the message of emergency contact unit 901 was presented in the web browser 105 or a sound was made to inform; in addition, the management staff 302 might be informed by e-mail or SMS (Short Message Service) message.

In the above example, the term "internet" meant the signal data was transmitted to the server unit by a wired way or a wireless way, wherein an access technology of the internet could be "wideband" or "narrowband".

The term "wideband" used herein, unless otherwise indicated meant Asymmetric Digital Subscriber Line (ADSL), Very High Bit-Rate DSL (VDSL), cable modem, optical fibre, wireless wideband, Power Line Communication or Satellite wideband (not limited to the above wideband).

The term "narrowband" used herein, unless otherwise indicated meant Integrated Services Digital Network, Universal Mobile Telecommunication System (UMTS), Code Division Multiple Access (CDMA) or $3^{rd}$-generation (not limited to the above narrowband).

Example 2

The Method for Processing the Parameter Data and Strength of the Signal Via a First Microprocessor and a Second Microprocessor As shown in FIG. 2, a first microprocessor 701 of the sensor 101 received analog signals of the three-axis accelerometer chip 1012, a pulse sensor probe 201 or an emergency button 301, converted analog signals into digital signals and obtained a specific value after calculation. Then, the data was transmitted to the wireless network transceiver module of the first RFIC 1013 periodically to turn on the radio function of the RFIC, and later transmitted to the receiver 102 via the wireless network system (such as wireless Ad Hoc network system 1011). Finally, sensor turned the radio function off, and would turn on again until the next transmission of next cycle to save power.

In addition, a second microprocessor 702 was used for collecting the parameter data and the wireless signal strength, transmitting the same to the local area network system (such as Ethernet network) 1021, and then transmitting the data to the specific network address periodically (the server unit 103).

Example 3

Testing the Packet Arriving Rate Under the Wireless Ad Hoc Network System

Figure 4:
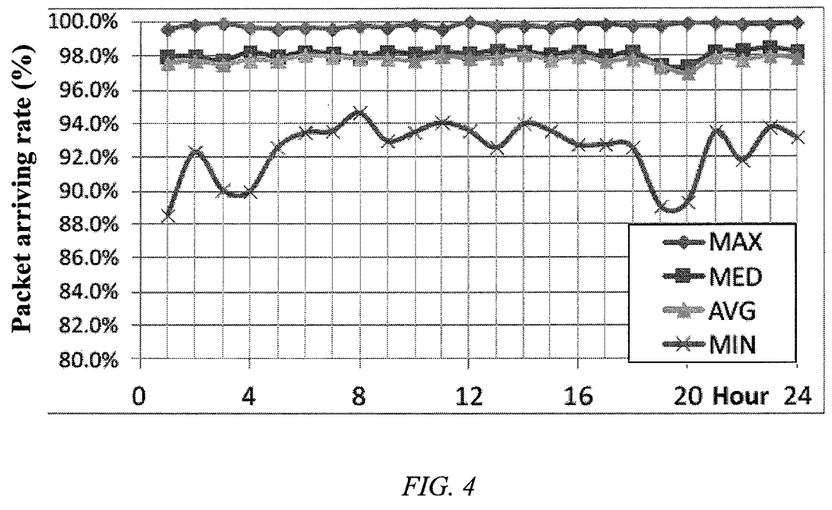
FIG. 4 shows that the present system is constructed under the wireless ad hoc network system. For testing of 100 sensors within 24 hours, the average packet arriving rate reaches up to 97% per hour.
Figure 5:
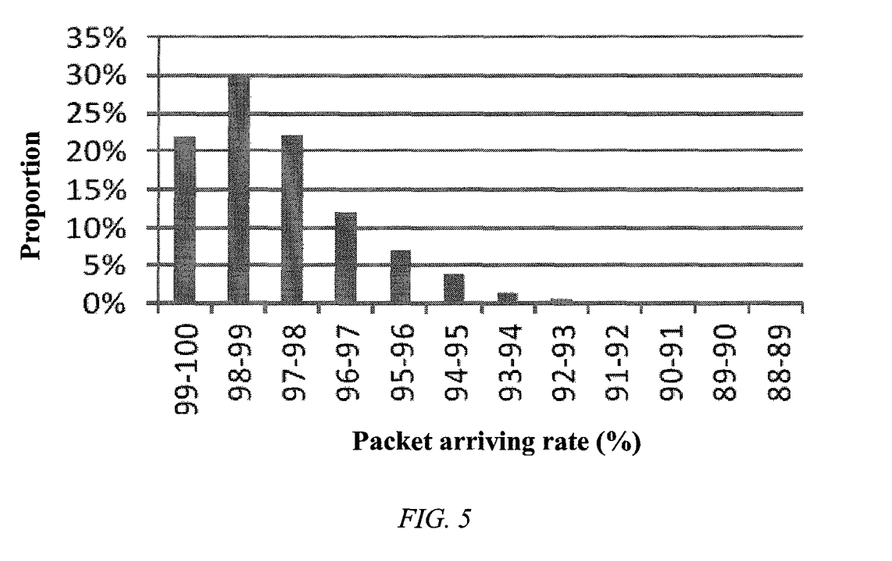
FIG. 5 shows the distribution of a single sensor for the packet arriving rate per hour under the wireless ad hoc network system of the present system.
Figure 6:
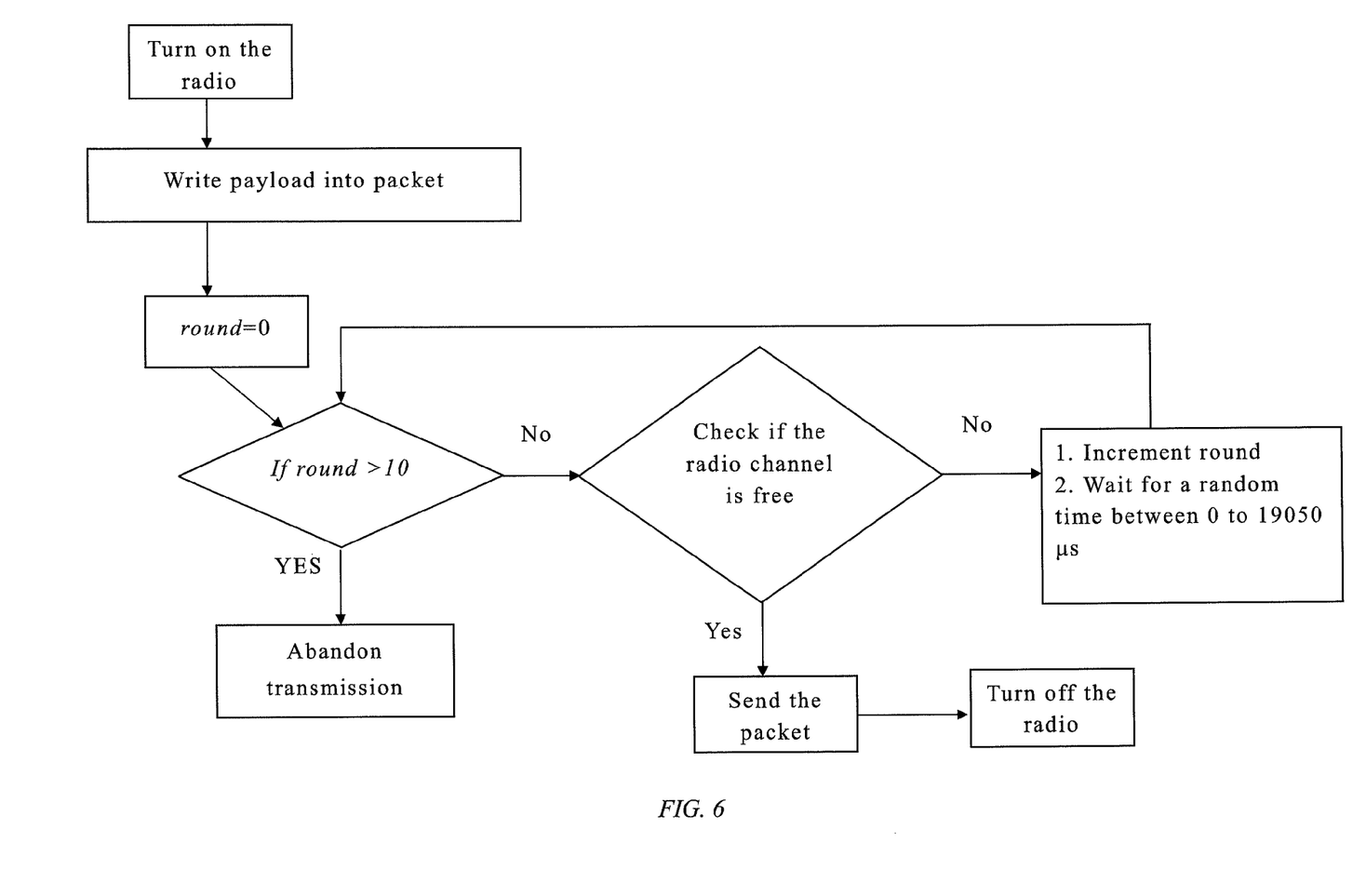
FIG. 6 shows a flow chart of the sensor of the present system transmitting the wireless packet.

The signal transmission of the present invention was constructed under the Wireless Ad Hoc Network system. In this example, to verify that the packet arriving rate reached more than 90% with respect to the transmission condition of 100 sensors to 1 receiver within 24-hour continuous testing, the local area network and the server were setup indoors and the sensors are scattered evenly around the receiver in a 5 meters radius. Each sensor transmitted a wireless packet to the receiver per 3 seconds, and then the data from the server unit after the whole system performed for 24 hours were read and analyzed. FIG. 4 showed that the packet arriving rate of the 100 sensors was 93~99% after 24-hour testing. The minimum packet arriving rate in the hourly distribution was still more than 88%. In addition, FIG. 5 showed the distribution of the packet arriving rate of a single sensor per hour. It could be calculated from FIG. 5 that the cumulative probability of the packet arriving rate above 95% is about 93%, and the cumulative probability of the packet arriving rate less than 90% is merely 0.25%.

In the past experience, a Bluetooth Master merely could connect with 7 clients, and Wi-Fi system merely could connect up to roughly 30 clients at most. In the Bluetooth and Wi-Fi system, the clients needed to search the wireless access point during signal transmission and it was power-consumptive; however, the system of the present invention was similar to Zigbee system. FIGS. 3 and 4 showed that the system of the present invention was under the Wireless Ad Hoc Network, and used a mechanism similar to Carrier Sense Multiple Access with Collision Avoidance (CSMA/CA) to prevent packet collision in the air. As shown in FIG. 4, when a lot of sensors transmitted a huge amount of data to the receiver, the packet arriving rate could still be over 93% in the 24 hours testing. The wireless system of the present invention was more energy-efficient than the past Zigbee, Bluetooth and Wi-Fi systems. In addition, the system of the present invention could monitor movement or location of the living alone person, the dementia person or the bed-ridden person in a large-scale to overcome the problem of the living alone person, the dementia person or the bed-ridden person occurring in every country currently.

All publications and patent applications cited in this specification are herein incorporated by reference as if each individual publication or patent application were specifically and individually indicated to be incorporated by reference.

The present invention has been described in terms of particular embodiments found or proposed by the present inventor to comprise preferred modes for the practice of the invention. It will be appreciated by those of skill in the art that, in light of the present disclosure, numerous modifications and changes can be made in the particular embodiments exemplified without departing from the intended scope of the invention. Moreover, due to biological functional equivalency considerations, changes can be made in protein structure without affecting the biological action in kind or amount. All such modifications are intended to be included within the scope of the appended claims.

What is claimed is:

1. A system for monitoring in real-time movement or location, comprising:
   (a) at least one sensor, comprising a three-axis accelerometer chip and a first radio frequency chip (RFIC), for detecting movement of at least one user or at least one article and transmitting a signal, comprising at least one parameter data, via a wireless ad hoc network system periodically;
   (b) at least one receiver, comprising a second radio frequency chip (RFIC) and being connected to the sensor via the wireless ad hoc network system, in which the second RFIC measures strength of the signal transmitted by the sensor, to receive the parameter data of the user or the article, and via a local area network system the parameter data is transferred to a network address periodically;
   (c) a server unit for setting at least one information of the user or the article, linking the information to the parameter data received from the receiver, and converting the parameter data into signal data by an operation unit of the server unit; and
   (d) a database unit being connected to the server unit for storing the signal data of the user or the article, for editing and publishing the signal data in a website via the server unit, and presenting the movement or location of the user or the article in a web browser.

2. The system of claim 1, wherein the sensor further comprises a detachable pulse sensor probe for transmitting a pulse signal to the receiver by the first RFIC via the wireless ad hoc network system.

3. The system of claim 1, wherein the sensor further comprises an emergency button, using the first RFIC to transmit the parameter data and the signal of the user or the article, which are transferred to the receiver via the wireless ad hoc network and further transmitted from receiver to the server unit via internet, thereby reminding a management staff to notice a condition of the user or the article.

4. The system of claim 1, wherein the parameter data comprises an identification number of the sensor, the movement status measured by the three-axis accelerometer chip, the pulse signal or a condition of the emergency button.

5. The system of claim 1, wherein the sensor further comprises a power amplifier to increase wireless strength of the signal.

6. The system of claim 1, wherein the receiver further comprises a wireless network transceiver module and a local area network module.

7. The system of claim 1, wherein the sensor comprises a first microprocessor and the receiver comprises a second microprocessor.

8. The system of claim 7, wherein the first microprocessor receives at least one analog signal of the sensor, converts the analog signal into a digital signal and transmits the digital signal to the wireless network transceiver module, and the second microprocessor collects the parameter data and the signal received from the wireless network transceiver module, and transmits the same to the local area network module.

9. The system of claim 1, wherein the server unit comprises an emergency contact unit, in which when a value of the parameter data sent by the sensor is lower or higher than a critical value set by the server unit, the emergency contact unit actively informs the management staff to confirm the movement or location of the user or the article.

10. The system of claim 1, wherein the local area network system is an Ethernet network.

11. The system of claim 1, wherein each of the server unit and the database unit is a cloud computing device.

12. The system of claim 1, wherein the information is personal information, article information, movement, pulse signal, signal value or location.

13. The system of claim 1, wherein the user is a living alone person, a dementia person or a bed-ridden person.

14. A method for monitoring in real-time movement or location, comprising steps of:
 (a) setting at least one information of a user or an article in a server unit;
 (b) detecting movement of the user or the article by a three-axis accelerometer chip, included in a sensor carried thereby, and transmitting at least one signal, comprising parameter data, periodically by a first radio frequency chip, included in the sensor, via a wireless ad hoc network system;
 (c) measuring strength of the signal transmitted by the sensor, and receiving the parameter data of the user or the article by a second radio frequency chip;
 (d) transmitting the parameter data and the signal to a network address periodically by the receiver via a local area network system;
 (e) linking the information of the step (a) to the parameter data received from the receiver;
 (f) converting the parameter data and the signal into signal data by an operation unit of the server unit; and
 (g) storing the signal data in a database unit, and editing and publishing in a website by the server unit so as to present the movement or location of the user or the article in a web browser.

15. The method of claim 14, further comprising a step of providing a wireless network transceiver module and a local area network module for the receiver.

16. The method of claim 14, further comprising a step of providing a first microprocessor for the sensor and providing a second microprocessor for the receiver.

17. The method of claim 16, wherein the first microprocessor receives at least one analog signal of the sensor, converting the analog signal into a digital signal, and transmitting the digital signal to the wireless network transceiver module, and the second microprocessor collects the parameter data and the signal received from the wireless network transceiver module, and transmitting the parameter data and the wireless signal strength to the local area network module.

18. The method of claim 14, wherein the parameter data comprises an identification number of the sensor, a movement status measured by the three-axis accelerometer chip, a pulse signal or a condition of an emergency button.

19. The method of claim 14, wherein the local area network system is an Ethernet network.

20. The method of claim 14, wherein the information is personal information, article information, movement, pulse signal, signal value or location.

21. The method of claim 14, wherein the user is a living alone person, a dementia person or a bed-ridden person.

\* \* \* \* \*